2,826,602

METHYLTRIHALOETHYLHALOADIPATES

Newman M. Bortnick, Oreland, and Marian F. Fegley, Mont Clare, Pa., assignors to Rohm & Haas Company, Philadelphia, Pa., a corporation of Delaware No Drawing. Application July 11, 1955
Serial No. 521,402

7 Claims. (Cl. 260—485)

This invention relates to methyltrihaloethylhaloadipates as new compositions of matter and to a method for their preparation.

The compounds of the present invention may be represented by the formula

in which X is a halogen atom having an atomic weight of about 19 to 127, Y is a halogen atom having an atomic weight of about 80 to 127, and R is a monovalent esterifying group of one to fourteen carbon atoms, to be more fully described hereinafter.

The present compounds may be prepared by reacting a tetrahalomethane with an α-methylene-α'-methyladipate in the presence of a free radical catalyst.

The tetrahalomethane reactants are compounds known to the art. It is vital to the success of the present reaction that the tetrahalomethane reactant contain at least one atom of bromine or iodine. The remaining three halogen atom requirements can be fulfilled by either fluorine, chlorine, bromine, or iodine. This is the preferred situation. Actually, it is possible to employ a dihalomethane or trihalomethane in the present reaction as long as one of the halogen atoms is either bromine or iodine. However, the results are not as satisfactory for the present purposes and, therefore, the tetrahalomethane is the preferred reactant.

Typical of the tetrahalomethane reactants that may be employed are bromotrichloromethane, dibromodichloromethane, tribromochloromethane, tetrabromomethane, bromotrifluoromethane, dibromodifluoromethane, tribromofluoromethane, bromotriiodomethane, dibromodiiodomethane, tribromoiodomethane, iodotrichloromethane, diiododichloromethane, triiodochloromethane, tetraiodomethane, iodotrifluoromethane, diiododifluoromethane, triiodofluoromethane, iodotribromomethane, triiodobromomethane, bromoiododichloromethane, chloroiododibromomethane, iodochlorodifluoromethane, chlorofluorodiiodomethane, and the like.

The α-methylene-α'-methyl adipate reactant may be represented by the formula

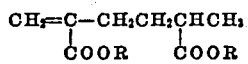

in which R is a monovalent esterifying group of one to fourteen carbon atoms. R must be composed principally or entirely of carbon and hydrogen. That is, R must be predominantly made up of carbon and hydrogen atoms although it may contain oxygen atoms. It is of critical significance that R contain from one to fourteen carbon atoms and be capable of forming an ester with the group —COO—. R may be a saturated aliphatic group; R may contain cyclic groups, either alicyclic or aromatic; and R may contain ether groups. Typical of the preferred representations of R are alkyl groups of one to fourteen carbon atoms, alkoxyalkyl groups of three to seven carbon atoms, aralkyl groups of seven to fourteen carbon atoms, cycloalkyl and alkylcycloalkyl groups of three to fourteen carbon atoms.

There may be employed as specific preferred embodiments of R the groups methyl, ethyl, isopropyl, butyl, octyl, decyl, dodecyl, tetradecyl, methoxyethyl, methoxypropyl, methoxyisopropyl, ethoxyethyl, ethoxyisopropyl, propoxyethyl, propoxypropyl, butoxyethyl, butoxypropyl, butoxyisopropyl, benzyl, phenylethyl, naphthylmethyl, phenylbutyl, phenylhexyl, phenylheptyl, phenyloctyl, cyclopropyl, cyclopentyl, cyclohexyl, butylcyclopentyl, octylcyclohexyl, cyclopentylheptyl, and cyclohexyloctyl. There may also be used as R, groups such as bornyl, nordicyclopentenyl, norcamphanyl, norcamphanylmethyl, and the like.

The α-methylene-α'-methyl adipate reactants are known or may be prepared by known methods. For instance, the dimethyl ester may be made by heating methyl methacrylate for 12 hours at about 225° C. under conditions of autogenous pressure and in the presence of about 1% hydroquinone as an inhibitor. Other adipate esters may be obtained by reacting α-methylene-α'-methyladipic acid or the corresponding acid chloride with the desired alcohol under esterifying conditions. Also, the dimethyl ester may be transesterified to any of the other esters of this invention.

The present reaction between the α-methylene-α'-methyl adipate and the tetrahalomethane is conducted in the presence of a free radical catalyst. These include azo compounds, organic peroxides, and ultraviolet light. The azo or peroxide catalysts may be used individually or in conjunction with ultraviolet light. The ultraviolet light may be used alone or in conjunction with azo or peroxide catalysts. The azo compounds employed are ones in which the —N=N— group is attached to aliphatic carbon atoms, at least one of which is tertiary. In these azo compounds, one of the carbons bonded to the tertiary carbon atom has its remaining valences satisfied by at least one nitrogen or oxygen atom. Typical of the azo compounds employed are azodiisobutyronitrile, azodiisobutyramide, dimethyl azodiisobutyrate, dibutyl azodiisobutyrate, azobis(α - methylbutyronitrile), azobis (α-methylvaleronitrile), dimethyl azobismethyl valerate, diethyl azobismethyl valerate, and the like. Among the organic peroxides that may be used are benzoyl peroxide, acetyl peroxide, caproyl peroxide, cumene hydroperoxide, tertiary butyl peroxide, butyl perbenzoate, butyl hydroperoxide, and the like. The particular catalyst employed is not critical and may be selected on the basis of convenience and economy. The critical consideration is that the catalyst be of the free radical type.

Temperatures in the range of about 25 to 170° C. may be employed. Appreciably below 25° C. the reaction does not readily occur. Substantially above 170° C. no additional benefits are obtained and, therefore, the extra effort is not rewarded. Also, appreciably above 170° C. in many instances, deleterious effects are sometimes observed. While the instant reaction is satisfactorily consummated in the temperature range of about 25 to 170° C., the preferred ranges will vary somewhat depending on the type of catalyst employed. When the azo compounds are employed as catalysts the preferred temperature range is about 60 to 85° C. The peroxide catalysts are most advantageously employed in the range of about 70 to 120° C., while ultraviolet light is used at about 25 to 60° C. When ultraviolet light is employed in conjunction with an azo or peroxide compounds the temperatures used are preferably about 25 to 60° C. The combination of free radical catalysts usually accelerates the rate of reaction. Therefore, if a shorter reaction time is deemed advisable, a combination of free radical catalysts is indicated.

The tetrahalomethane and α-methylene-α'-methyl adipate react in substantially equimolecular proportions. Since both of the reactants are usually liquids it is somewhat advantageous to conduct the reaction in the presence of an excess of the tetrahalomethane. The reaction is readily consummated under these conditions, although exact equimolecular proportions of reactants are satisfactory. A solvent may be employed, if desired, but such is not necessary, especially when the tetrahalomethane is employed in excess. Actually, the reaction does not progress as rapidly when a solvent is employed and, therefore, if a slower reaction rate is desired the use of a solvent is indicated. The solvent should be a volatile inert organic one such as pentane, hexane, benzene, toluene, xylene, carbon tetrachloride, chloroform, and the like.

The reaction progresses readily at atmospheric pressures and yields of greater than 90% are consistently obtained. The product is isolated, preferably by distillation.

It is frequently advantageous to employ the dimethyl ester as the α-methylene-α'-methyl adipate reactant and then, after the reaction with the tetrahalomethane, obtain any of the other esters of this invention by transesterification. Usually by employing this method the tetrahalomethane addition reaction progresses somewhat more rapidly. It is, however, quite satisfactory to start with the adipate reactant in the ester form desired in the product. If the R groups are to be the same in the product, it is generally somewhat preferable to form the product by reacting the di R ester of α-methylene-α-methyl adipic acid with the desired tetrahalomethane. If the R groups are to be different and the desired product would contain an R that could be supplied by an ROH compound having a boiling point of about 150° C. or more, the transesterification modification is somewhat preferable, employing an adipate reactant containing a methyl ester group. The ester group to be transesterified, if only one is to be so treated, must necessarily be on the carboxyl group remote from the double bond since the activities of the ester groups are apparently such that that ester group is completely transesterified before the other reacts. The transesterification is conducted after the tetrahalomethane addition has been effected. It is possible, if desired, to form products of this invention by transesterification, preferably of the dimethyl ester, involving both ester groups, but such is not preferred.

If it is desired to obtain other esters of this invention by transesterifying a dimethyl α-halo-α-(β,β,β-trihaloethyl)-α'-methyl adipate, instead of by direct addition of a tetrahalomethane to the proper α-methylene-α'-methyl adipate ester, a strongly acidic esterifying catalyst is employed such as sulfuric acid, lower alkane sulfonic acid, p-toluenesulfonic acid, and the like. It is possible to employ a strongly acidic ion exchange resin, if desired. The transesterification is preferably conducted at the reflux temperature of the reaction mixture. Temperatures in the range of 100 to 275° C. are usually employed with the range of about 150 to 225° C. somewhat preferred. The pressure is adjusted, when necessary, to conform to the above temperatures. Also, if desired, small amounts of a volatile inert organic solvent, such as toluene, xylene or the like, may be used to help regulate the reflux temperature. Methyl alcohol is distilled off as the transesterification progresses and the reaction is continued until the theoretical amount of methyl alcohol is collected. In this way it is possible to transesterify either one or both of the ester groups concerned, as desired.

At the conclusion of the transesterification, the product is isolated, such as by neutralizing the acid catalyst with moist sodium carbonate, filtering, and distilling, preferably under reduced pressure.

The products of this invention are valuable as plasticizers, particularly for polyvinyl chloride, that impart flame-retardant properties to the plastic material. For instance, a mixture of 60 parts of polyvinyl chloride, 40 parts of

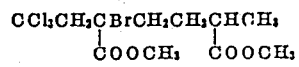

1 part of tribasic lead sulfate, and 0.5 part of stearic acid was milled for seven minutes at 325° F. The resulting film was clear and flexible. This film was tested for flammability and found to be superior to a commercially acceptable flame-resistant plasticizer tested in a similar formulation. The present products react with glycols to form polyesters and alkyd resins, both having flame-resistant properties. It is somewhat preferable in the present instance to have at least one methyl ester group present in the product. The product containing two methyl ester groups is especially useful for the present purposes.

The compounds and method of this invention may be more fully understood from the following illustrative examples in which parts by weight are used throughout.

*Example 1*

There were added to a reaction vessel, equipped with a stirrer, thermometer, and reflux condenser, 30 parts of dimethyl α-methylene-α'-methyl adipate, 100 parts of bromotrichloromethane, and 0.4 part of benzoyl peroxide. The mixture was heated to reflux (115 to 130° C.) and periodically there was added benzoyl peroxide over a span of about thirty hours until 1.65 additional parts had been introduced. After two additional hours of refluxing the mixture was fractionally distilled and the product collected at 155 to 165/1.4 mm. The product was identified as dimethyl α-bromo-α-(β,β,β-trichloroethyl)-α'-methyl adipate.

In a similar manner, there was prepared diethyl α-iodo-α-(β,β,β-trichloroethyl)-α'-methyl adipate.

*Example 2*

There were introduced into a reaction vessel 56 parts of dipropoxypropyl α-methylene-α'-methyl adipate, 150 parts of tetrabromomethane, and 0.4 part of benzoyl peroxide. The mixture was heated at reflux for thirty hours during which time there was periodically introduced benzoyl peroxide until 1.50 additional parts had been added. The mixture was refluxed for three hours after the last benzoyl peroxide addition. The mixture was fractionally distilled and the product collected. The product was identified as dipropoxypropyl α-bromo-α-(β,β,β-tribromoethyl)-α'-methyl adipate.

The same product was obtained by using one half the amount of benzoyl peroxide employed above and ultraviolet light. The reaction was conducted at 50 to 75° C.

*Example 3*

There were added to a reaction vessel 40 parts of dimethyl α-bromo-α-(β,β,β-trichloroethyl)-α'-methyl adipate, 40 parts of butoxyethanol and 1 part of concentrated sulfuric acid. The mixture was refluxed at 75 mm. pressure while continuously removing volatile components below a head temperature of 50° C. The reaction was discontinued after 6 parts of methanol had been collected in the receiver. The reaction mixture was treated with three parts of moist sodium carbonate, filtered, and distilled under reduced pressure. The product was collected at 235 to 250° C./0.1 mm. and was identified as dibutoxyethyl α-bromo-α-(β,β,β-trichloroethyl)-α'-methyl adipate.

There was prepared in a similar way, by terminating the reaction after 3 parts of methanol had been collected in the receiver, the product in which there was one methyl ester group and one butoxyethyl ester group.

*Example 4*

There were added to a reaction vessel 53 parts of dibenzyl α-methylene-α'-methyl adipate, 100 parts of tribromochloromethane, and 0.25 part of azodiisobutyronitrile. The mixture was heated at 75 to 85° C. for thirty hours during which time there were added four .25 part portions of azodiisobutyronitrile. The reaction mixture was fractionally distilled and the product collected. The product corresponded to dibenzyl α-bromo-α-(β,β,β-dibromochloroethyl)-α'-methyl adipate having the formula

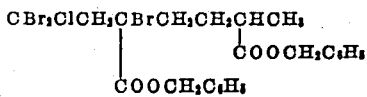

Example 5

There were added to a reaction vessel 54 parts of dicyclohexyl α-methylene-α'-methyl adipate, 100 parts of iodotrifluoromethane, and 0.25 part of benzoyl peroxide. The reaction mixture was heated at reflux for twenty-eight hours during which time there was intermittently introduced small portions of benzoyl peroxide until a total of 1.50 parts had been added. The reaction was continued for two hours after the last benzoyl peroxide addition and then the reaction mixture was fractionally distilled. The product was collected and identified as dicyclohexyl α-iodo-α-(β,β,β-trifluoroethyl)-α'-methyl adipate.

In a similar manner, the dibutylcyclohexyl ester was employed in the present reaction.

We claim:

1. As new compositions of matter, compounds having the formula

in which Y is a halogen atom having an atomic weight of about 80 to 127, X is a halogen atom having an atomic weight of about 19 to 127, and R is a member from the class consisting of alkyl groups of one to fourteen carbon atoms, alkoxyalkyl groups of three to seven carbon atoms, aralkyl groups of seven to fourteen carbon atoms, and cycloalkyl and alkylcycloalkyl groups of three to fourteen carbon atoms.

2. As new compositions of matter, compounds having the formula

in which Y is a halogen atom having an atomic weight of about 80 to 127, X is a halogen atom having an atomic weight of about 19 to 127, and R is an alkyl group of one to fourteen carbon atoms.

3. As new compositions of matter, compounds having the formula

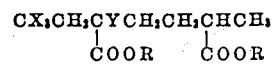

in which Y is a halogen atom having an atomic weight of about 80 to 127, X is a halogen atom having an atomic weight of about 19 to 127, and R is an alkoxyalkyl group of three to seven carbon atoms.

4. As new compositions of matter, compounds having the formula

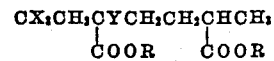

in which Y is a halogen atom having an atomic weight of about 80 to 127, X is a halogen atom having an atomic weight of about 19 to 127, and R is an aralkyl group of seven to fourteen carbon atoms.

5. As a new composition of matter

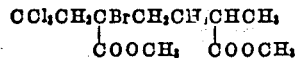

6. As a new composition of matter

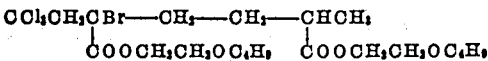

7. As a new composition of matter

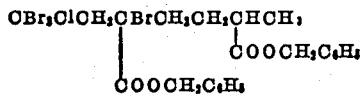

References Cited in the file of this patent

UNITED STATES PATENTS

| | | |
|---|---|---|
| 2,195,712 | Jacobson | Apr. 2, 1940 |
| 2,232,785 | Howk | Feb. 25, 1941 |
| 2,244,487 | Crawford | June 3, 1941 |
| 2,244,645 | Jacobson | June 3, 1941 |
| 2,468,208 | Kharasch | Apr. 26, 1949 |
| 2,485,099 | Kharasch | Oct. 18, 1949 |
| 2,515,306 | Ladd et al. | July 18, 1950 |
| 2,677,676 | Nichols et al. | May 4, 1954 |

OTHER REFERENCES

Riddle: "Monomeric Acrylic Esters," Reinhold Publishing Corp., New York, New York (1954), pp. 56–58, 192.